United States Patent [19]
Lieberman et al.

[11] Patent Number: 5,185,671
[45] Date of Patent: Feb. 9, 1993

[54] ADAPTIVE CONTROL OF AN ELECTRONIC IMAGING CAMERA

[75] Inventors: Laurence A. Lieberman, Bowie; Philip Downes, Baltimore, both of Md.

[73] Assignee: Westinghouse Electric Corp., Pittsburgh, Pa.

[21] Appl. No.: 720,271

[22] Filed: Jun. 21, 1991

[51] Int. Cl.$^5$ .................... H04N 5/238; H04N 7/18
[52] U.S. Cl. .................................. 358/228; 358/99; 358/209
[58] Field of Search .............. 358/99, 95, 211, 213.19, 358/228, 174, 909, 209

[56] References Cited

U.S. PATENT DOCUMENTS

| 4,638,367 | 1/1987 | Sakane et al. | 358/228 |
| 4,695,894 | 9/1987 | Saito et al. | 358/228 |
| 4,806,964 | 2/1989 | Tamada et al. | 358/228 |
| 4,918,519 | 4/1990 | Suzuki et al. | 358/909 |
| 4,928,172 | 5/1990 | Uehara et al. | 358/174 |
| 4,969,045 | 11/1990 | Haruki et al. | 358/228 |
| 5,053,878 | 10/1991 | Sang Jo et al. | 358/228 |

OTHER PUBLICATIONS

"Homomorphic Filters", I. Pitas et al, Kluwer Academic Press Publishers, Nonlinear Digital Filters, Principles and Applications, 1990.

Primary Examiner—Michael T. Razavi
Assistant Examiner—Wendy R. Greening
Attorney, Agent, or Firm—D. Schron

[57] ABSTRACT

A CCD imaging camera is adaptively controlled by: illuminating a reflectance field of view, selectively sensing a desired image field area within the field of view and generating an image signal thereof, reducing low frequency components of the sensed area image signal, generating a contrast signal from the image signal, generating an average or mean signal from a plurality of image contrast signals, comparing the mean signal with a reference signal corresponding to a predetermined contrast maximum value, and thereafter controlling the light level or the range of the camera to the object field.

21 Claims, 4 Drawing Sheets

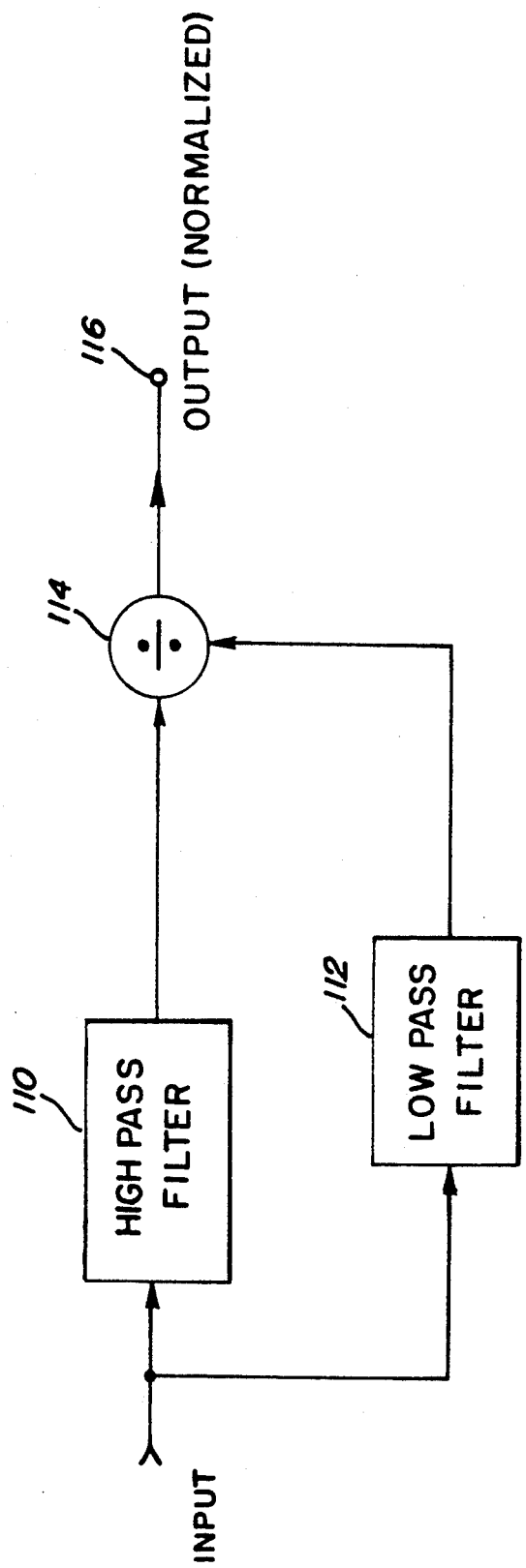

ADAPTIVE CONTROL OF AN ELECTRONIC IMAGING CAMERA

BACKGROUND OF THE INVENTION

1. Field of the Invention

This invention relates generally to the control of optical imaging cameras and more particularly to the control of the light levels and sensor-object distance parameters for an electronic camera system.

2. Discussion of the Prior Art

Charge Coupled Device (CCD) imaging cameras are generally well known and can provide a relatively high standard of image resolution. Although not limited to underwater applications, CCD cameras have been found to be particularly useful in connection with an underwater optical system where the optical imagery data is not or cannot be reviewed in real time by a human operator.

The current state of the art for setting optical camera system lighting levels in underwater imaging systems typically uses an instrument that senses the underwater imaging environment called a transmissometer which operates to determine only the volume attenuation coefficient of the water medium. Currently available transmissometers operate to a depth of a few thousand meters; however, such instruments normally require recalibration prior to every underwater mission of twenty four hours or less.

The ability to provide all the necessary information to ensure that quality optical images are being collected without the use of a transmissometer would result in a savings in weight and the expense associated with the development and production would be a significant improvement. The elimination of a housing comprised of titanium or other expensive and heavy material along with the transmissometer would also be a valuable advancement in the art. This would also remove the problem of the electronics stability of the illumination and receiver devices in the transmissometer which cannot be effectively monitored or calibrated during data collection which is needed for accurate image operation monitoring.

Presently lacking is a system and/or method for adaptively adjusting the lighting levels and the camera distance between sensor and object which for an underwater vehicle comprises its altitude above the sea floor. Such a control is particularly desirable for an underwater optical system mounted on an autonomously operated vehicle where real time imagery cannot be reviewed by a human operator. Thus it would be of vital importance if one could control an in-situ CCD electronic camera without the need of a transmissometer or human assistance so that imaging affects of not only the water medium, but also of any changes to the lighting and camera efficiency characteristics can be sensed and changed throughout a data collection mission and thus eliminate the need for real time operator review of the optical imagery and eliminate the need for other sensor hardware.

SUMMARY

Accordingly, it is the primary object of this invention to provide an improvement in the control of an electronic camera system.

It is another object of the invention to provide an improvement in the control of a charge coupled device electronic camera system.

It is still a further object of the invention to provide for the control of the light level and sensor-object distance for an electronic camera system.

And it is still another object of the invention for adaptively controlling, without human intervention, an underwater electronic camera so that it accounts for and automatically adjusts for changes in the water environment and changes both in the illumination and camera subsystem efficiencies and performance instabilities throughout the duration of an imaging mission.

The foregoing and other objects of the invention are achieved through a method and apparatus for: illuminating a reflectance field of view, selectively sensing a desired image field area within the field of view and generating an image signal thereof, reducing low frequency components of the sensed area image signal, generating a contrast signal from the image signal, generating an average or mean signal from a plurality of contrast signals, comparing the mean signal with a reference signal corresponding to a predetermined contrast threshold, and thereafter controlling the light level or the range of the camera to the object field.

BRIEF DESCRIPTION OF THE DRAWINGS

The following detailed description of the invention will be more readily understood when considered in conjunction with the accompanying drawings in which:

FIG. 5 is a diagram illustrative of another method or apparatus for implementing the image processor shown in FIG. 1.

DETAILED DESCRIPTION OF THE INVENTION

The invention, the details of which follow herein, uses electronic data from a charge coupled device (CCD) camera to control critical aspects of an optical imaging system wherein imagery data is processed and used to establish, compare and control key parameters of the imaging process. The specific sequences of processing described hereinafter first ensures the image contrast observed in the images are due solely to the reflectance characteristics of the object plane being imaged. This utilizes an optimized filter function in the frequency domain to highlight edges and reduce slowly varying contrast gradients within the image or alternatively, when desirable, a subtractive imaging technique is used. The measured image contrast is then compared to a preset threshold value whereby the operational lighting and altitude parameters are established and continually maintained to ensure that the minimum image contrast threshold is being obtained in the collected optical imagery.

To ensure that acceptable optical quality imagery is being obtained, it is necessary to ensure by lighting and altitude control of the camera bearing platform that each image possesses a minimum image contrast value. Image contrast C is a parameter which will be defined herein in terms of the image intensity I and more particularly as the ratio of the highest intensity pixel value minus the lowest intensity pixel value to the highest intensity pixel value plus the lowest intensity pixel value in the image, i.e., $$C = \frac{I_{max} - I_{min}}{I_{max} + I_{min}} \quad (1)$$

Figure 1:
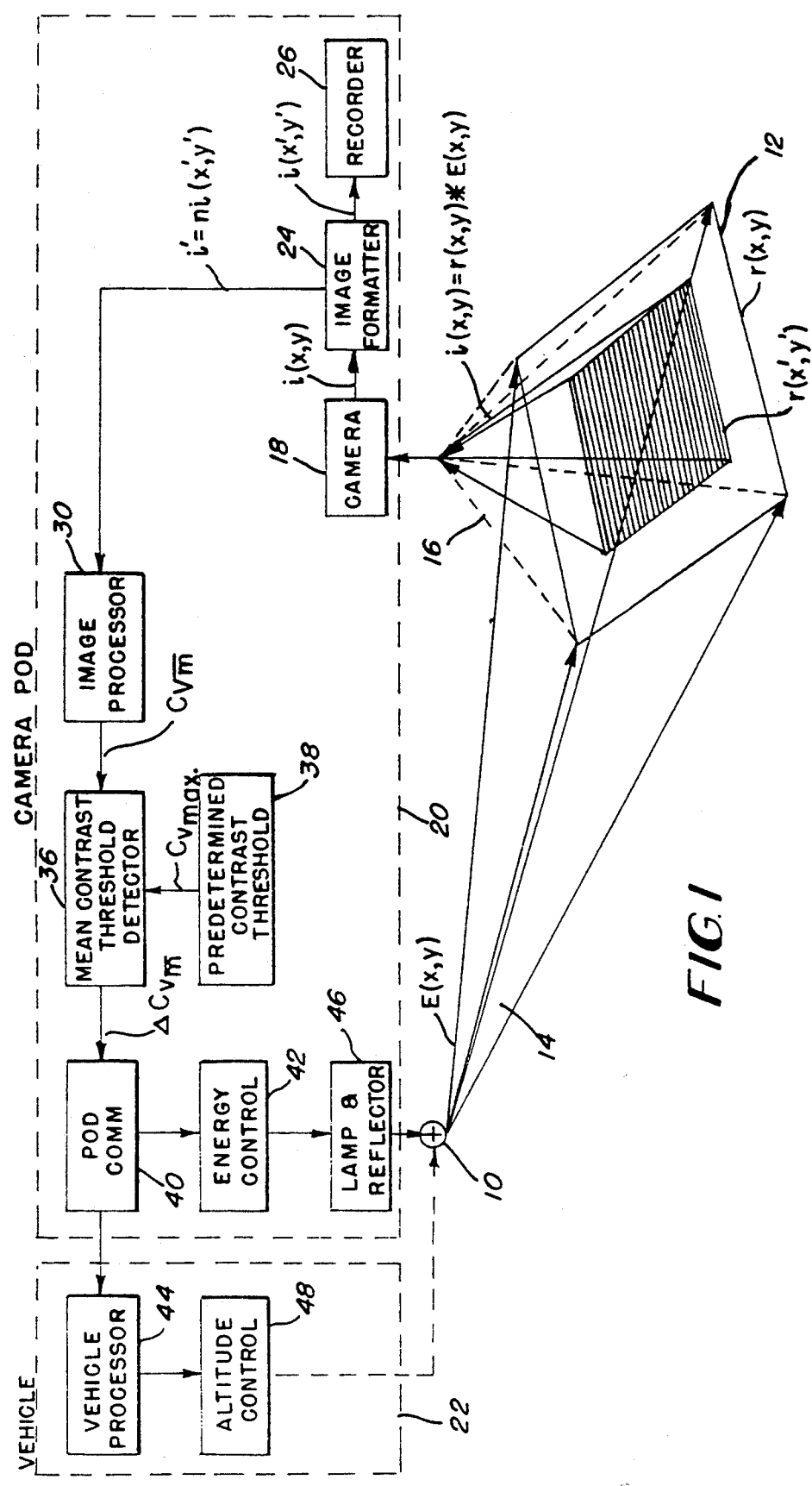
FIG. 1 is an electrical block diagram illustrative of a preferred embodiment of apparatus for controlling a CCD electronic camera in accordance with this invention.

Referring now to the drawings and more particularly to FIG. 1, reference numeral 10 denotes a source of optical energy or illumination which is directed to a reflective surface 12 and which may include, for example, the sea floor and one or more objects, not shown, resting thereon. The reflectance pattern r(x,y) 12 from an illuminating beam of illumination 14 is shown for purposes of illustration only as being a square rectangular pattern which reflects back as a scene or image i(x,y) via a return beam 16 to a CCD electronic camera 18 which is located on a camera pad 20 mounted on a remotely operated underwater vehicle 22, such as a sled, towed by a second vehicle which may be, for example, a ship or an aircraft, not shown. Also the underwater vehicle 22 can be an autonomously operated vehicle. Additionally, the image i(x,y) may be viewed as a line image i(x,1).

The CCD camera 18 may be rectangular and having (256 ×256 pixels) or linear (256×1 pixels) and includes an image formatter 24. The camera 18 is responsive to a relatively smaller reflectance field r(x',y') to generate an image i(x',y') which is comprised of two components, namely reflectance r(x',y') and illumination E(x',y') which combine in a multiplicative fashion. This combination can be expressed as:

$$i(x',y') = r(x',y') * E(x',y'). \quad (2)$$

Figure 2:
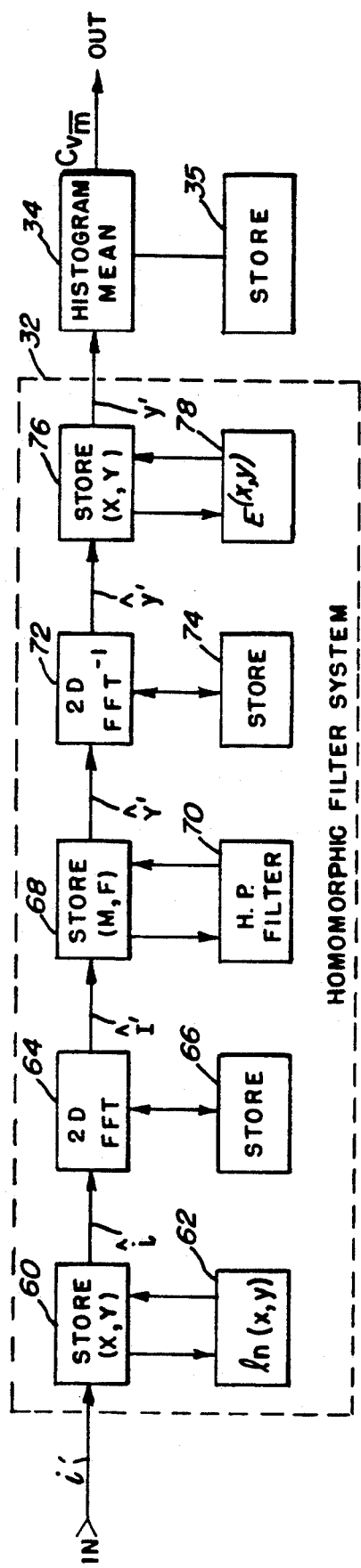
FIG. 2 is an electronic block diagram of one type of apparatus for implementing the image processor shown in FIG. 1.

Each image or scene i(x',y') is fed to a recorder 26. A plurality (n) of scene samples i' = ni(x',y') where n = 12, for example, is also fed to an image processor 30. One embodiment of the image processor 30 is shown in FIG. 2 and is comprised of a homomorphic filter system 32 and means 34 for generating an average or mean image contrast signal $C_{\overline{vm}}$. This output signal is fed to a mean contrast threshold detector 36 which comprises a comparator for comparing the signal $C_{\overline{vm}}$ with a predetermined contrast threshold signal $C_{vmax}$ generated by a level setting device 38. The output of the comparator detector 36 comprises a signal $\Delta C_{\overline{vm}}$ is fed to a command module 40 which generates signals fed to an illumination energy control block 42 and a vehicle altitude data processor 44. The energy control circuit 42 provides a control signal for an illumination generating device 46 while the vehicle processor 44 generates signal for an altitude control circuit 48 which is adapted to control the altitude of the underwater vehicle 22 s as to vary its present altitude above the ocean floor 12.

Figure 3:
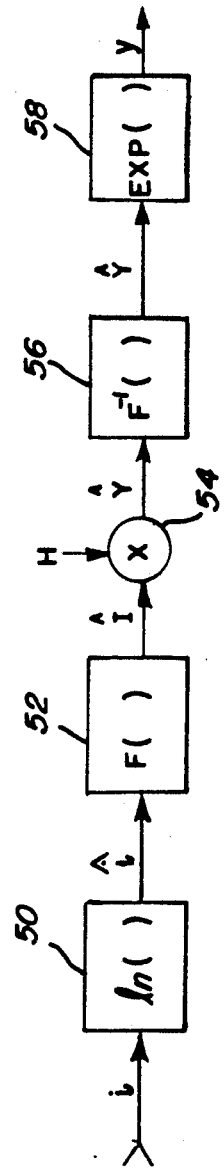
FIG. 3 is a functional block diagram generally illustrative of means for implementing a homomorphic signal filter.

Referring now to FIG. 3, shown thereat is a block diagram generally illustrative of a homomorphic filter system which is particularly adapted for the processing of convolved and non-linearly related signals which include such terms as r(x',y') and E(x',y') of equation (2).

As shown, an input signal i, which may be, for example, an image signal, is fed to a functional block 50 which implements a logarithmic (natural) transfer function (ln) providing a logarithmic output signal $(\hat{I})$. This signal is next fed to a functional circuit block 52 which performs a Fourier transform on the signal $(\hat{I})$ providing output of $(\hat{I})$. The Fourier transformed signal is next subjected to a homomorphic filtering process H in a functional block 54 which implements the function, $$H(\Omega x, \Omega y) = \gamma \quad (3)$$

where $\Omega$ comprises a signal filtering function $\hat{\gamma}$ is a predetermined filter characteristic e.g., a high pass filter, resulting therefrom. The filtered transform signal $\hat{Y}$ is next fed to an inverse Fourier transform functional block 56 providing an output of $\hat{Y}$ which is then fed to a signal block 58 which implements an exponential or inverse logarithmic transfer function to provide a homomorphically filtered output signal y.

Further details of homographic filters are set forth in Chapter 7 entitled "Homomorphic Filters", of a textbook entitled *Non-Linear Digital Filters, Principles and Applications*, by I. Pitas et al., Kluwer Academic Press Publishers, 1990.

A natural logarithmic function is first used in signal block 50 because it transforms a multiplicative process to an additive one by taking the natural logarithm of both terms r(x',y') and E(x',y') and thus implement the expression:

$$ln[i(x', y')] = ln[r(x',y')] + ln[E(x',y')] \quad (4)$$

This now leads to a further consideration of FIG. 2 wherein a homomorphic filter system 32 and mean signal generator 34 is used to implement the image processor 30 shown in FIG. 1. As shown, a composite i' of a plurality (n) of images i is fed to a first memory 60 which is adapted to store, for example, 256×256 bytes and which is coupled bidirectionally to a digital functional block 62 which can process the natural logarithmic function of the bytes stored in the memory 60 and which are returned thereto to provide an output signal i' which is then fed to a two dimensional Fast Fourier Transform (2D FFT) processor 64 which is bidirectionally coupled to a respective memory 66. The output of $(\hat{I})'$ the Fast Fourier Transform device 64 is fed to a third digital storage or memory 68 which is coupled to high pass filter means 70 for high pass filtering $(\hat{I})'$ and providing an output $\hat{Y}'$ which is fed to an inverse two dimensional Fast Fourier Transform processor 72 which also has an associated digital storage 74, and which outputs an inverse transform signal $\hat{y}'$. The signal $\hat{y}'$ is fed to yet another digital memory 76 which is bidirectionally coupled to a functional block 78 which implements an exponential transfer function so as to output a homomorphically filtered signal y'.

The high pass linear filter 70 is used to remove the slowly varying illumination components in the optical image i' that modify the image contrast value $C_y$. Since non-uniform illumination clearly affects image contrast, it must therefore be suppressed or at least substantially reduced in the image. This is due to the fact that non-uniform illumination effects are expressed in the low spatial frequency region as a slowly varying random process. The two dimensional Fourier Transform is used to provide the appropriate transformation to the frequency domain where homomorphic filtering can be applied to suppress the non-uniform illumination effects. In the frequency domain, the illumination spectrum occupies the region of low spatial frequencies and a reflectance spectrum occupies the regions of higher frequencies. Therefore, the characteristics of a homomorphic filter comprising a linear high pass filter results in an enhancement of the reflectance component while attenuating the illumination component. The resultant image will be one having a higher contrast in the original unprocessed image. It is this process or homomorphically filtered image contrast value $C_v$ that is used to establish and adjust the optical camera system lighting level and altitude changes.

In order to do this, however, the present invention in the image processor 30 also includes apparatus 34 for generating a histogram comprising the mean value of contrast $C_{\overline{vm}}$ With respect to establishing a maximum contrast threshold value $C_{vmax}$, it should be noted that optical imaging systems are designed to satisfy specific imaging requirements. These requirements ensure that particular objects can be imaged with the developed or available lighting and the camera-object geometry taken into account the object's spatial extent and its reflectance value and the relative reflectance value to its surroundings. From these requirements a maximum contrast value is determined so that it can be used to compare with the contrast of the real time imagery in the threshold detector 36 as collected by the CCD electronic camera 18.

It is a relatively straightforward procedure to establish a desired, post filtered maximum image contrast threshold value $C_{vmax}$. It can be generated by collecting a set of images using the CCD camera in a controlled environment, i.e. where: (1) the water environment, (2) lighting level, (3) lighting-object scene-CCD camera imagery, and (4) test targets set with known reflectance values can be controlled. These pre and post filtered images are reviewed to ensure the images and those expected to be imaged during an actual in situ use are of a predetermined quality minus other image enhancement processes. Alternatively, a desired image scene contrast threshold can be established and used.

Figure 4:
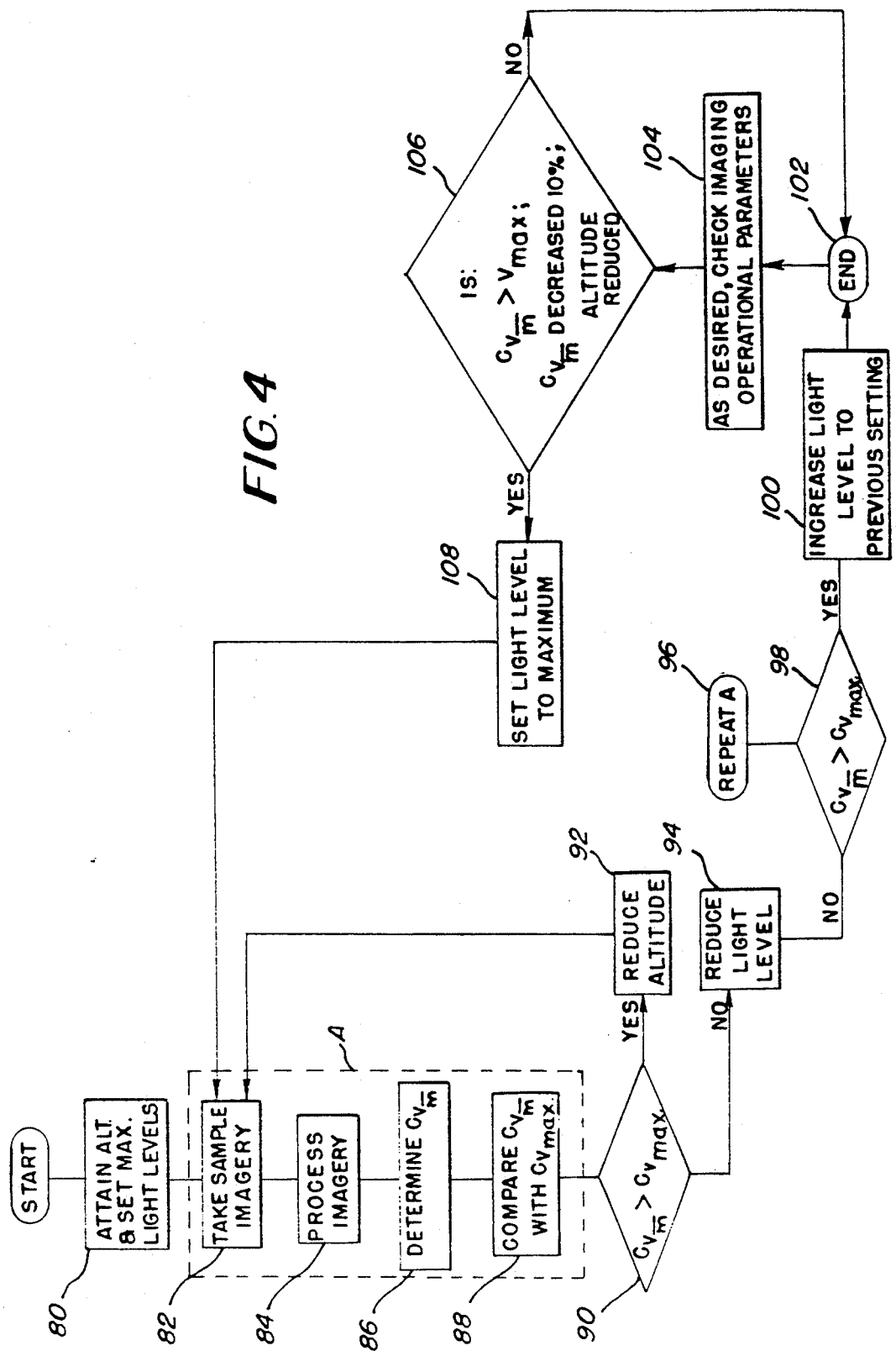
FIG. 4 is a logic flow chart of the preferred method for controlling the CCD camera system shown in FIG. 1.

In operation and as depicted in the multiple step flow chart of FIG. 4, upon submerging, the camera carrying vehicle 22 maneuvers to a planned pre-mission altitude where the maximum lighting level is set. This is shown by the step 80. At this altitude, one or more sample images are taken as shown in step 82 using the CCD electronic camera system included in the camera 18 and it is processed per step 84.

It is important to note that the image includes a relatively large pixel count for implementing either a long linear array, e.g. a line array of 256×1 pixels, or an area array of, for example, 256×256 pixels to ensure an image is obtained which has a sufficiently large background content. Next the mean image contrast $C_{\overline{vm}}$ is determined using several, typically twelve, images as shown by step 86. This ensures that a better mean image contrast value $C_{\overline{vm}}$ obtained and which therefore lessens the contribution to this value from an untypically high or low localized object region. This is followed by a comparison between the values of $C_{vm}$ with a predetermined maximum contrast value $C_{vmax}$ as shown by step 88. Steps 82 through 88 are defined as Process A. If the image contrast mean $C_{\overline{vm}}$ is larger than the predetermined image contrast maximum $C_{vmax}$ as indicated by the query step 90, then a command 92 is generated to reduce altitude via vehicle processor 44 and the altitude control 48. On the other hand, if the image contrast mean is less than the image contrast threshold, then a command 94 is generated to reduce the lighting at the source 10 via the energy control 42 and the lamp 46.

Process A, step 96, is repeated followed by another comparison between $C_{\overline{vm}}$ and $C_{vmax}$ as shown by step 98. Now once $C_{\overline{vm}}$ is determined to be greater than $C_{vmax}$, the lighting level is set at the previous light level setting, step 100, whereupon data collection can commence assuring the collected imagery contains the desired image contrast content, step 102.

During the data collection operation, step 102, it is or may be desirable to intermittently or continuously monitor the set imaging operational parameters. This is indicated by step 104. The parameters should be reset per step 106 if $C_{\overline{vm}}$ becomes greater than $C_{vmax}$, $C_{\overline{vm}}$ decreases by 10 percent or more in value, or the altitude is changed. If any of these conditions occur, the sequence to properly set the imaging operational parameters is again initiated by increasing the lighting level to its maximum setting by reverting to step 108, and reproceeding as before to evaluate the imaging process via step 82 and forward. If none of the conditions exist as shown in query step 106, the current light levels and altitude is maintained, step 102.

It should be noted that many techniques can be used to perform image processing to sense the image scene content. Each process has its own implementation requirements and robustness for reducing the lighting contribution to the imaged scene contrast. One preferred technique disclosed herein utilizes the concept of homomorphic filtering which is very robust in removing illumination contributors to scene image contrast, but may require additional or dedicated hardware when large CCD formats and/or the rate of collection (frame rate) is great.

Another preferred approach which allows for a simpler and less costly implementation is a line subtraction technique which utilizes consecutive image information along one or more lines within the CCD focal plane. Such a technique would utilize, among other things, hardware such as shown in FIG. 5. There the image data is filtered in a high pass filter 110 to look at only the high frequency component of the image signal input. It is also filtered in a low pass filter 112 to generate a normalizing signal via a divider circuit 114. The normalized output at terminal 116 becomes a constant value for repeated image looks at the same scene independent of light level as long as good contrast exists. If the scene were observed with inadequate light, the output would decrease. Therefore, the recommended procedure is to first view the scene at full light power (step 80) and then generate a normalized output (step 84). Inadequate output from terminal 116 would indicate that full light power was inadequate and the vehicle should be lowered toward the sea floor as shown in step 92. Then the output light power is lowered as indicated at step 94 which is compared with that obtained at the higher power output by repeating Process A at step 96. If there is no difference, then there is still adequate power at the lower light level. The procedure of lowering the output power would continue per step 94 until the output decreases, or the minimum output power is determined to be adequate. This would indicate reduced contrast signaling that the light output is inadequate. The next higher light output setting would then be chosen for the operation as indicated in step 100.

Thus the requirement for real time, human assistance, is eliminated. This allows for "smart" autonomous optical imaging operation by utilizing a closed loop feedback control of the system. Additionally, it encapsulates the full imaging environment which includes lighting, water environment, camera lens and sensor and actively operates in response to changes or variation in any of these parameters. Furthermore, the present invention eliminates the need for transmissometer sensor hardware and thus provides for a less massive total sensor package. This directly affects in a positive way the energy balance for a remotely operated or autonomous vehicle. The elimination of hardware also reduces the sensor's package volume and can potentially allow for an enhanced packaging design for an overall sensor system.

Having thus shown and described what is at present considered to be the preferred method and embodiment for carrying out the invention, it should be noted that the same has been made by way of illustration and not limitation. Accordingly, all modifications, changes and alterations coming within the spirit and scope of the invention as set forth in the appended claims are herein meant to be included.

We claim:

1. A method for adaptively adjusting the camera lighting level and distance between a camera and a light reflectance object plane including a reflectance field of view, comprising the steps of:
    illuminating a reflectance field of view;
    sensing a desired image field within the reflectance field of view;
    generating an image signal of said image field;
    generating a plurality of image parameter signals from the image signal;
    generating a means image parameter signal from said plurality of image parameter signals;
    comparing said mean image parameter signal with a predetermined reference signal and generating a difference signal therefrom;
    initially reducing the camera lighting when the mean image parameter signal is less than said predetermined reference signal,
    reducing said distance between the camera and the light reflectance object plane when the mean image parameter signal is greater than said predetermined reference signal;
    thereafter repeating said comparing step; and
    again reducing the camera lighting when the mean image parameter signal is less than said predetermined reference signal but increasing the camera lighting to a predetermined previous level set when the mean image parameter signal is greater than said reference signal.

2. A method for adaptively adjusting the camera lighting level and distance between a camera and a light reflectance object plane including a reflectance field of view, comprising the steps of:
    illuminating a reflectance field of view;
    sensing a desired image field within the reflectance field of view;
    generating an image signal of said image field;
    generating a plurality of contrast parameter signals from said image signal, said contrast parameter signals being a function of intensity of luminance of the image field;
    generating a mean contrast parameter signal;
    comparing said mean contrast parameter signal with a reference signal corresponding to a predetermined contrast level and generating a contrast difference signal;
    initially reducing the camera lighting when the mean contrast parameter signal is less than said predetermined contrast level,
    reducing said distance between the camera and the light reflectance object plane when the mean contrast parameter signal is greater than said predetermined contrast signal;
    repeating said comparing step; and
    then reducing the camera lighting when the mean contrast parameter signal is less than said predetermined contrast value but increasing the camera lighting to a predetermined previous level set when the mean contrast parameter signal is greater than said predetermined contrast value.

3. The method of claim 2 wherein said step of generating a mean contrast parameter signal includes the step of reducing low frequency components in said image signal.

4. The method of claim 3 wherein said step of reducing said low frequency components includes the step of homomorphically filtering said image signal.

5. The method of claim 3 wherein said step of reducing said low frequency components includes the step of high pass filtering said image signal.

6. The method of claim 5 and additionally including the step of low pass filtering said image signal, and dividing the high pass filtered image signal by the low pass filtered image signal and generating a normalized image signal.

7. The method of claim 2 and further including the steps of mounting said camera on a water vehicle and viewing the sea floor.

8. The method of claim 7 wherein said water vehicle comprises an underwater vehicle and said image area lies on or in the vicinity of the sea floor.

9. The method of claim 8 wherein said camera comprises an electronic camera.

10. The method of claim 9 wherein said electronic camera comprises a CCD electronic camera.

11. A method for adaptively adjusting the camera lighting level and distance between a camera and a light reflectance object plane including a reflectance field of view, comprising the steps of:
    illuminating a reflectance field of view;
    sensing a desired image field within the reflectance field of view;
    generating an image signal of said image field;
    homomorphically filtering said image signal for reducing low frequency components therefrom;
    generating at least one contrast parameter signal from the filtered image signal, said contrast parameter signal being a function of intensity or luminance of the image field;
    comparing said at least one contrast parameter signal with a reference signal corresponding to a predetermined contrast level and generating a contrast difference signal; and
    controlling the light level or the distance between the camera and the light reflectance object plane as a function of said contrast difference signal.

12. The method of claim 11 wherein said step of homomorphically filtering includes the further steps of:

converting the components of said image signal to logarithmic image components, adding said logarithmic image components to from a logarithmic composite image, performing a Fourier transform on said composite image, high pass filtering the transformed composite image, performing an inverse Fourier transform on the filtered composite image, and applying an exponential transfer function to the inverse transformed composite image to provide an output image signal having enhanced reflectance characteristics and attenuated illumination characteristics.

13. Apparatus for adaptively adjusting the camera lighting level and distance between a camera and a light reflectance object plane including a reflectance field of view, comprising:

means for illuminating a reflectance field of view;

means for sensing a desired image field within the reflectance field of view;

means for generating an image signal of said image field;

means for generating a plurality of image parameter signals from the image signal, said contrast parameter signal being a function of intensity of luminance of the image field;

means for generating a mean contrast parameter signal from said plurality of contrast parameter signals;

means for comparing said mean contrast parameter signal with a reference signal corresponding to a minimum contrast level and generating a contrast difference signal; and means for controlling the light level or the distance between the camera and the light reflectance object place as a function of said contrast difference signal.

14. The apparatus of claim 13 wherein said means for generating a mean contrast parameter signal includes means for reducing low frequency components in said image signal.

15. The apparatus of claim 14 wherein said means for reducing said low frequency components includes means for reducing homomorphically filtering said image signal.

16. The apparatus of claim 14 wherein said means for reducing said low frequency components includes means for high pass filtering said image signal.

17. The apparatus of claim 16 and additionally including, means for low pass filtering said image signal, and means for dividing the high pass filtered image signal by the low pass filtered image signal to generate a normalized image signal.

18. The apparatus of claim 13 and additionally including means for mounting said camera on a water vehicle nd viewing the sea floor.

19. The apparatus of claim 18 wherein said water vehicle comprises an underwater vehicle and said image area lies on or in the vicinity of the sea floor.

20. The apparatus of claim 18 wherein said camera comprises an electronic camera.

21. The apparatus of claim 20 wherein said electronic camera comprises a CCD electronic camera.

* * * * *